United States Patent [19]

Song

[11] Patent Number: 5,499,388
[45] Date of Patent: Mar. 12, 1996

[54] RADIO WITH FREQUENCY SCANNING AND INTERFERENCE DETECTION CAPABILITY FOR REMOTE CONTROLLED MODEL AIRCRAFT

[75] Inventor: Byung M. Song, Gillette, N.J.

[73] Assignee: Polk's Model Craft Hobbies, Inc., Jersey City, N.J.

[21] Appl. No.: 139,943

[22] Filed: Oct. 20, 1993

[51] Int. Cl.$^6$ ........................................ H04B 15/00
[52] U.S. Cl. .................... 455/62; 455/63; 455/67.3; 455/92; 455/161.3; 455/352; 446/456; 341/176
[58] Field of Search ................ 455/62, 63, 67.1, 455/67.3, 67.4, 67.7, 88, 69, 70, 151.1, 151.2, 352, 161.1, 161.3, 34.1, 34.2, 92; 446/456, 454; 340/825.57, 825.71, 825.77, 825.69, 825.72; 341/176

[56] References Cited

U.S. PATENT DOCUMENTS

| | | |
|---|---|---|
| 2,580,453 | 1/1952 | Murray et al. . |
| 4,081,747 | 3/1978 | Meyerle ........................... 455/88 |
| 4,177,426 | 12/1979 | Gaishin et al. ..................... 361/814 |
| 4,197,500 | 4/1980 | Klein et al. . |
| 4,206,411 | 6/1980 | Meyer . |
| 4,227,259 | 10/1980 | Mogi .............................. 455/352 |
| 4,238,791 | 12/1980 | Wiebalck . |
| 4,334,221 | 6/1982 | Rosenhagen et al. . |
| 4,365,347 | 12/1982 | Otsuka et al. . |
| 4,479,215 | 10/1984 | Baker . |
| 4,618,998 | 10/1986 | Kawamura ........................ 455/34.1 |
| 4,780,885 | 10/1988 | Paul et al. . |
| 5,030,156 | 7/1991 | Savicki, Sr. . |
| 5,109,529 | 4/1992 | Akaiwa . |
| 5,123,112 | 6/1992 | Choate . |
| 5,148,548 | 9/1992 | Meche et al. . |
| 5,161,249 | 11/1992 | Meche et al. . |
| 5,203,012 | 4/1993 | Patsiokas et al. ..................... 455/62 |
| 5,212,831 | 5/1993 | Chuang et al. . |

FOREIGN PATENT DOCUMENTS

| | | | |
|---|---|---|---|
| 2805069 | 8/1979 | Germany | ............... 446/456 |
| 3833841 | 4/1990 | Germany | ............... 446/456 |
| 0318397 | 12/1989 | Japan | ................... 455/88 |

OTHER PUBLICATIONS

Whiteley, J D, "Radio Control System", Sep. 1976, pp. 716–719.

Primary Examiner—Reinhard J. Eisenzopf
Assistant Examiner—Doris To
Attorney, Agent, or Firm—Lerner, David, Littenberg, Krumholz & Mentlik

[57] ABSTRACT

A remote control system for use with model aircraft provides a user with the capability of placing the remote control system into a scanning mode wherein a receiver scans through a plurality of channels having a predetermined frequency bandwidth and frequency interference detection circuitry is activated upon detection of interference picked up by the receiver on a channel within the selected bandwidth. Warning circuitry is provided to communicate with the frequency interference detection circuitry for providing a warning signal to a user that interference has been detected. A clear channel is then selected and tuning circuitry permits locking of the receiver and the transmitter on the clear channel so that a user can control the flight of a model aircraft by sending rf signals from the transmitter to the receiver.

33 Claims, 11 Drawing Sheets

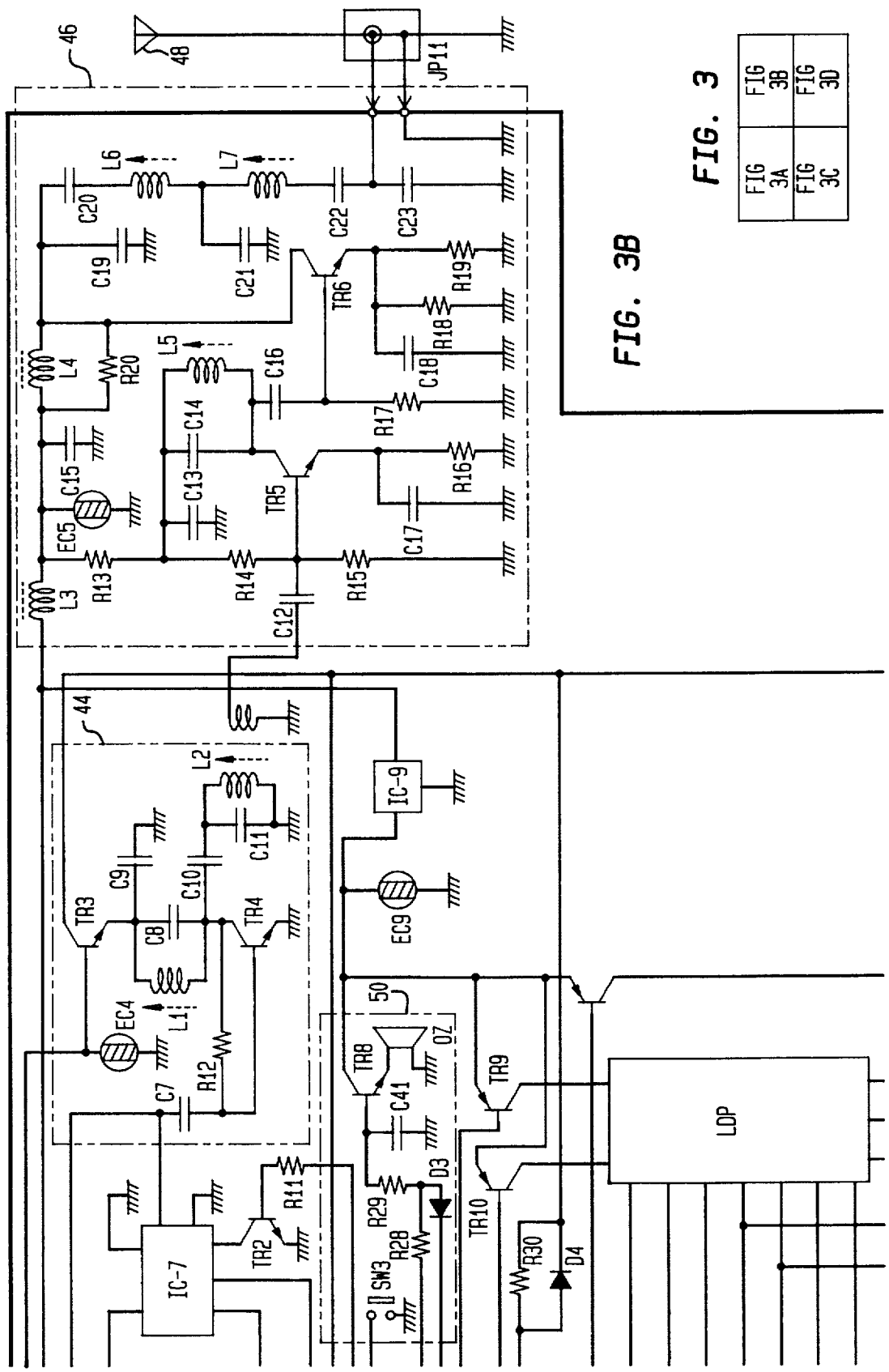

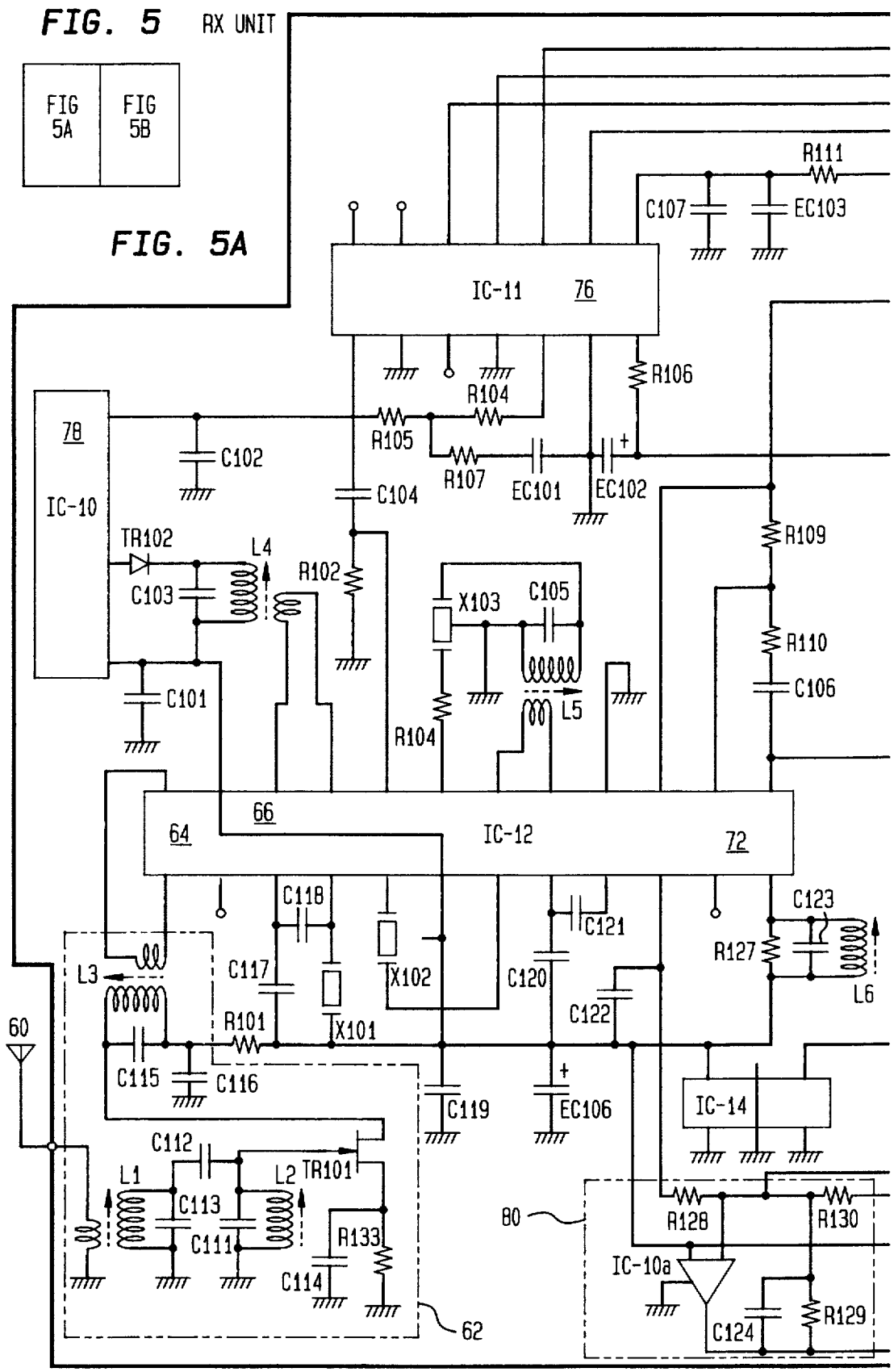

RADIO WITH FREQUENCY SCANNING AND INTERFERENCE DETECTION CAPABILITY FOR REMOTE CONTROLLED MODEL AIRCRAFT

FIELD OF THE INVENTION

The present invention relates to remote control systems for model aircraft. More particularly, the present invention relates to a remote control system to be used with model aircraft, having scanning capability to scan through a plurality of channels and to detect rf interference thereon so that a clear channel can be selected for operating the associated model aircraft.

BACKGROUND OF THE INVENTION

Flying of model aircraft, such as model airplanes, is a popular hobby enjoyed by thousands of individuals around the country. Since most people who enjoy flying model aircraft do not have a sufficient amount of open land on their own property, they often go to flying fields that are shared by many other individuals.

On a typical day, twenty or more individuals may share space at a flying field to fly their model aircraft. The aircraft are typically controlled by separate remote control systems including a receiver mounted in the aircraft and a base transmitter unit having one or more flying controls thereon. Under the rules promulgated by the FCC and adopted by the AMA (Academy of Model Aeronautics), all remote control systems for model aircraft must operate on rf energy over a frequency range of 72.01–72.99 MHz. This frequency range is broken down into fifty channels, each being spaced at 20 kHz increments. Thus, there are a limited number of channels available to individuals who wish to fly model aircraft. This has presented a problem in the past, especially when more than one of the flying enthusiasts at a common flying site attempts to operate their model aircraft at the same time and on the same channel. If this condition should arise, mutual interference over the common channel will cause a loss of control over the model aircraft being flown on the common channel. Often, the mutual interference will cause all of the affected model aircraft to crash.

Attempts to control this problem in the past have been made by flying clubs and by the owners of the common flying sites by establishing a "rule" that once a available channel is selected, a frequency flag must be taken to serve as a warning to all others that the channel corresponding to the frequency flag is no longer available. Despite these attempts, many accidents continue to occur due to interference.

SUMMARY AND OBJECTS OF THE INVENTION

The present invention alleviates the aforementioned problems of the prior art by providing a remote control system for use with model aircraft, having the capability to scan through all of the available channels and to detect whether interference exists on such channels. Most preferably, a warning signal is provided to a user when interference is detected and rf communication is automatically precluded between a transmitter and a receiver over the unclear channel.

In accordance with a preferred embodiment of the present invention, the remote control system includes receiver means which may be mounted in a model aircraft for receiving rf signals within a selected bandwidth. Transmitter means may be arranged in a base unit remote from the receiver means for transmitting rf signals to be picked up by the receiver means within a selected bandwidth. A frequency interference detection circuit may be provided for detecting interference within the selected bandwidth picked up by the receiver means. Warning means may be adapted to communicate with the frequency interference detection circuitry for providing a warning signal to a user that interference has been detected within the selected bandwidth. Scanning means is also preferably provided for selectively scanning the receiver means through a plurality of channels having a predetermined frequency bandwidth so that the frequency interference detection circuitry can determine whether interference exists on the channels. Once a clear channel is detected, tuning means may be utilized for locking the receiver means and the transmitter means on a selected one of the plurality of channels so that the user may control the flight of a model aircraft by sending rf signals from the transmitter means to the receiver means. Thus, the same receiver which is normally used in flight to detect rf-borne control signals from the transmitter is used during the scanning mode to detect potentially interfering signals. The frequency interference detection circuitry typically is arranged to accept input from the receiver during scanning.

The remote control system may also include means for permitting a user to selectively place the system into a scanning mode wherein the scanning means and the receiver means are operational. In this mode, the remote control system will not permit any rf energy to be transmitted from the receiver means.

The remote control system may also include means for permitting a user to selectively place the system into a transmitting mode. When the system is placed in this mode, the transmitting means is permitted to transmit rf energy to communicate with the receiver means so that a user can control the flight of an associated model aircraft. The scanning means is rendered nonoperational when the system is placed in its transmitting mode.

Lockout means may be provided for automatically preventing placement of the remote control system into the transmitting mode upon detection of interference on a particular channel. The transmitter means may include a power supply and channel memory means for recalling the last channel selected.

The remote control system may also be adapted for selective placement into a stand-by mode wherein the power supply may provide power to the channel memory means and wherein no rf power can be emitted from the transmitter means. When this embodiment is utilized, the remote control system may immediately be placed back into its transmitting mode without requiring the temporary placement into a scanning mode.

The scanning means may include manual channel selection means for permitting manual scanning through the plurality of available channels when the remote control system is in its scanning mode. Alternatively or additionally, the scanning means may include automatic channel selection means for automatically scanning the receiver through the plurality of available channels when the remote control system is in the scanning mode.

The remote control system of the present invention may also comprise a base unit housing. In a preferred embodiment, the transmitter means, the frequency interference detection circuitry, the warning means and the scanning means may be arranged in the base unit housing. The receiver means is normally arranged in an associated model aircraft to be controlled.

The means for selectively placing the system into the scanning mode may comprise a jumper cable for electrically connecting the receiver means to the scanning means to permit communication therebetween. In use, the jumper cable extends from the base unit housing to the model aircraft while the system is being set up for a flight. The system may automatically enter the scanning mode when the jumper cable is connected and may revert to the transmitting mode when the cable is removed. The scanning means may be operative to adjust the receiver means on the transmitter means to a selected one of the plurality of channels and to thereafter stop the adjustment when a channel free of interference is obtained.

In still another preferred embodiment, the warning means of the remote control system may comprise audio and visual circuitry to send audio and visual signals for detection by a user upon the presence of the detected rf interference signal.

In a particularly preferred arrangement, the frequency interference detection means of the remote control system may include interference quantification means, such as a meter indicator, for determining the relative strength of the detected rf interference signal when the remote control system is placed into its scanning mode. The same meter may also function as a power supply signal indicator to detect available power in the power supply of the receiver when the remote control system is placed into its transmitting mode.

The tuning means of the present invention may comprise phase-locked loop circuitry and a voltage controlled oscillator in conjunction with a microcomputer chip.

A further aspect of the present invention provides a combination including the remote control system in conjunction with the model aircraft. In this combination, the receiver means is desirably arranged within the model aircraft whereas the transmitter means, is arranged in a base unit housing separate from the aircraft.

According to another aspect of the present invention, a method of selecting a frequency band for use when flying remotely controlled model aircraft is provided. The method may comprise the steps of providing power to a remote control system including a transmitter, a receiver, scanning circuitry, and frequency interference detecting circuitry and warning circuitry. The remote control system may be placed into a scanning mode wherein no rf energy can be transmitted from the transmitter and wherein the scanning circuitry is operational to actuate the receiver to scan through a plurality of channels so that the interference detecting circuitry can determine whether interference exists on the plurality of scanned channels. The step of selecting a channel that is free of interference may be performed manually or automatically. A warning signal may be provided upon detection of interference by the frequency interference detecting circuitry. A channel may then be selected that is free of interference, and the receiver and the transmitter may be tuned to the selected channel. The remote control system may then be placed into a transmitting mode wherein the scanning circuitry is nonoperational and wherein the transmitter can transmit rf energy on the selected channel to communicate with the receiver so that a user can control the flight of an associated model aircraft.

In accordance with an additional preferred step of the method of the present invention, the step of placing the remote control system into a scanning mode may comprise temporarily connecting a jumper cable between the scanning circuitry and the receiver.

In a particularly preferred method, the step of placing the remote control system into the transmitting mode may comprise the step of removing the jumper cable from its conducting position between the scanning circuitry and the receiver. When the receiver is arranged in a model aircraft and when at least some of the other components of the remote control system are arranged in a base unit housing, the step of connecting the jumper cable between the scanning circuitry and the receiver may comprise connecting the jumper cable between a port in the base unit housing and a port in the model aircraft. Similarly, when this preferred embodiment is used, the step of removing the jumper cable may comprise removing the jumper cable from the port in the base unit, from the port in the model aircraft or both.

Preferred embodiments of the present invention provide remote control systems for use in connection with model aircraft which are safer and more efficient than prior art systems.

To this end, it is an object of the present invention to provide a remote control system having a transmitting system and a receiver wherein the remote control system can be selectively placed into a scanning mode in which the receiver may be scanned through all of the channels over a selected rf bandwidth to determine whether interference exists. It is a further object of the present invention to permit tuning of the transmitter and/or receiver so that they can be locked onto a selected channel for flying an associated model aircraft.

It is still another object of the present invention to provide means for placing the remote control system into a transmitting mode wherein rf signals may be transmitted by the transmitter and received by the receiver to control flying operations of model aircraft. The receiver may not be scanned through the channels in the transmitting mode and, conversely, no rf energy may be transmitted by the transmitter when the remote control system is placed in its scanning mode.

The preferred devices according to the present invention provide frequency interference detection circuitry and warning circuitry within the remote control system that will detect interference received by the receiver when the system is in its scanning mode and will provide a warning signal to a user in response to the detected interference.

The preferred systems according to the invention can be manufactured and sold at a reasonable cost so that many individuals can enjoy the efficient and safe flying of model aircraft achieved by use of the present invention.

These and other objects, features and advantages of the present invention will be more clearly understood when read in conjunction with the detailed description and the accompanying drawings which follow.

BRIEF DESCRIPTION OF THE DRAWINGS

FIG. 3 is a block diagram showing the relationship of the schematic circuit diagrams FIGS. 3A–D.

FIG. 3B is a schematic circuit diagram showing a second part of the transmitted system of FIG. 2.

FIG. 5 is a block diagram showing the relationship of the schematic circuit diagrams FIGS. 5A–B.

FIG. 5A is a schematic circuit diagram showing a first part of the receiver circuitry of FIG. 4.

DETAILED DESCRIPTION

Figure 1:
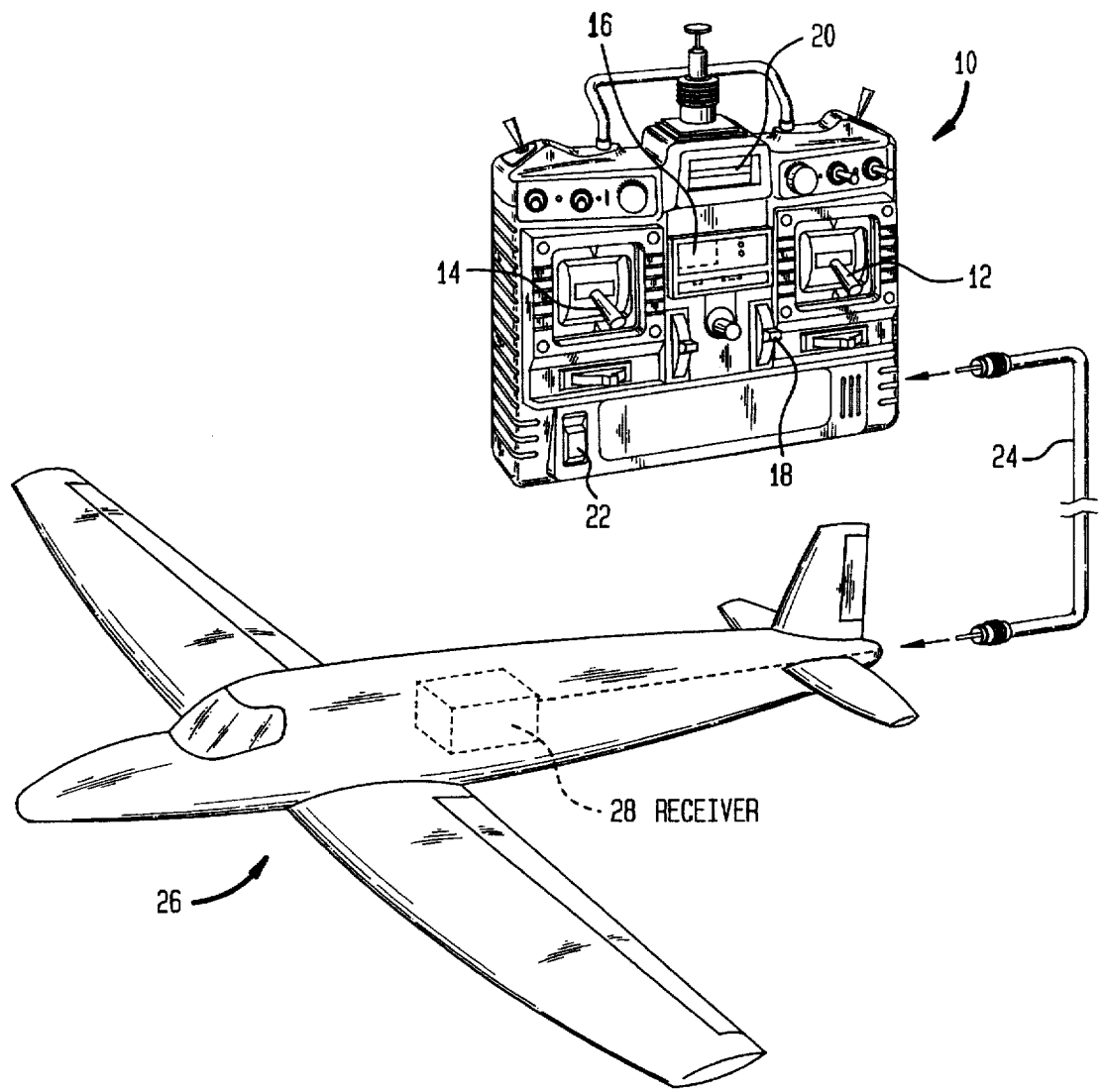
FIG. 1 is a perspective view depicting portions of a system in accordance with an embodiment of the present invention.

In accordance with one embodiment of the present invention, a base unit generally designated 10 for a transmitting system is shown in FIG. 1 in correspondence with a model airplane 26. A receiver 28 is mounted in model airplane 26. A jumper cable 24 is adapted to electrically connect the transmitting system within the base unit 10 to a receiver 28 within the model airplane 26. The term "transmitting system" as used in this disclosure includes a transmitter and associated electronic components mounted in the same housing. As further discussed below, the transmitting system also includes scanning circuitry for scanning through a plurality of channels, frequency interference detection circuitry for detecting interference within the frequency range defined by the plurality of channels, warning circuitry adapted to warn a user of the presence of frequency interference and tuning circuitry for locking the receiver and the transmitter on a common channel for RF communication. The combination of the circuitry which makes up the transmitting system will be discussed in detail below.

Base unit 10 is intended to be used by individuals who wish to fly model aircraft, such as model airplanes. Throughout the remainder of this application, the words model airplane will be used in place of the words model aircraft. However, it should be appreciated that the present invention may be used in connection with other types of model aircraft besides model airplanes such as, for example, model helicopters. The term "model airplane" as used herein should also be taken as including model land and sea vehicles.

When a user first pushes the power switch 22 of the base unit 10 from its off position to its on position, no rf energy will be transmitted by the transmitter circuitry therein. After the transmitting system within the base unit 10 is turned on, the jumper cable 24 should be connected between the transmitting system within the base unit 10 to the receiver 28 within the model airplane 26. As soon as the jumper cable 24 connects the transmitting system to the receiver 28, the remote control system is automatically placed into its "scanning" mode. In this mode, the remote control system is adapted to scan through all fifty available channels over the frequency range of 72.01–72.99 MHz. The fifty channels are spaced at about 20 kHz increments over the entire frequency range. The spacing of these channels are standard in the industry and are governed by the FCC. The AMA has adopted the rules of the FCC.

The scanning and interference detection circuitry of the transmitting system is a particularly important aspect of the present invention. It permits a user to scan the receiver through all fifty channels that are presently available for use in connection with remote control systems for model aircraft. The channels may be individually and slowly scanned by pushing the right gimbal 12 upward or downward to advance to the next or preceding channel. If the gimbal 12 is fully retained in an upward or downward position, a user can scroll through all of the available channels. Alternatively, automatic scrolling of the channels may be accomplished by pushing the automatic scrolling switch 18 to its on position. A LED display 16 will clearly indicate which channel is being scanned or used for communication at a given time.

When a channel having interference is detected during the scanning mode, various warning signals will be provided to a user to indicate the existence of such interference. For example, the LED display 16 will blink and an audible signal will be generated. The rf signal strength meter 20 will also move to a displaced position to indicate that interference exists on the selected channel. The user continues scanning either by operating gimbal 12 or by using scrolling switch 18 until a clear channel is found. If no interference is detected on a selected channel, the base unit 10 will not provide any warning indication and the LED display 16 will clearly display the channel number, indicating that the displayed channel is free from interference. This will indicate that it is safe to fly on the indicated channel and that the remote control system may be taken out of its scanning mode and placed into its transmitting mode.

The system is taken out of the scanning mode and placed into the transmitting mode by removing the jumper cable 24 from the base unit 10 and the receiver 28. The removal of the jumper cable 24 will automatically place the remote control system into its transmitting mode wherein the transmitter is free to transmit rf energy to communicate with the receiver 28 so that the flight of an associated model airplane can be controlled. It is not possible to scan the receiver through the channels while the remote control system is in its transmitting mode. Thus, the right gimbal 12 will no longer control channel selection and the automatic scrolling switch 18 will no longer permit scrolling of the channels. Instead, the right gimbal 12, the left gimbal 14 and the scrolling switch 18 will be used for flight control features only. The rf signal strength indicating function of the meter 20 will be disabled when the remote control system is no longer in its scanning mode. Instead, the meter 20 will function as a battery signal indicator to determine the strength of the battery in the transmitting system when the remote control system is in its transmitting mode.

Figure 2:
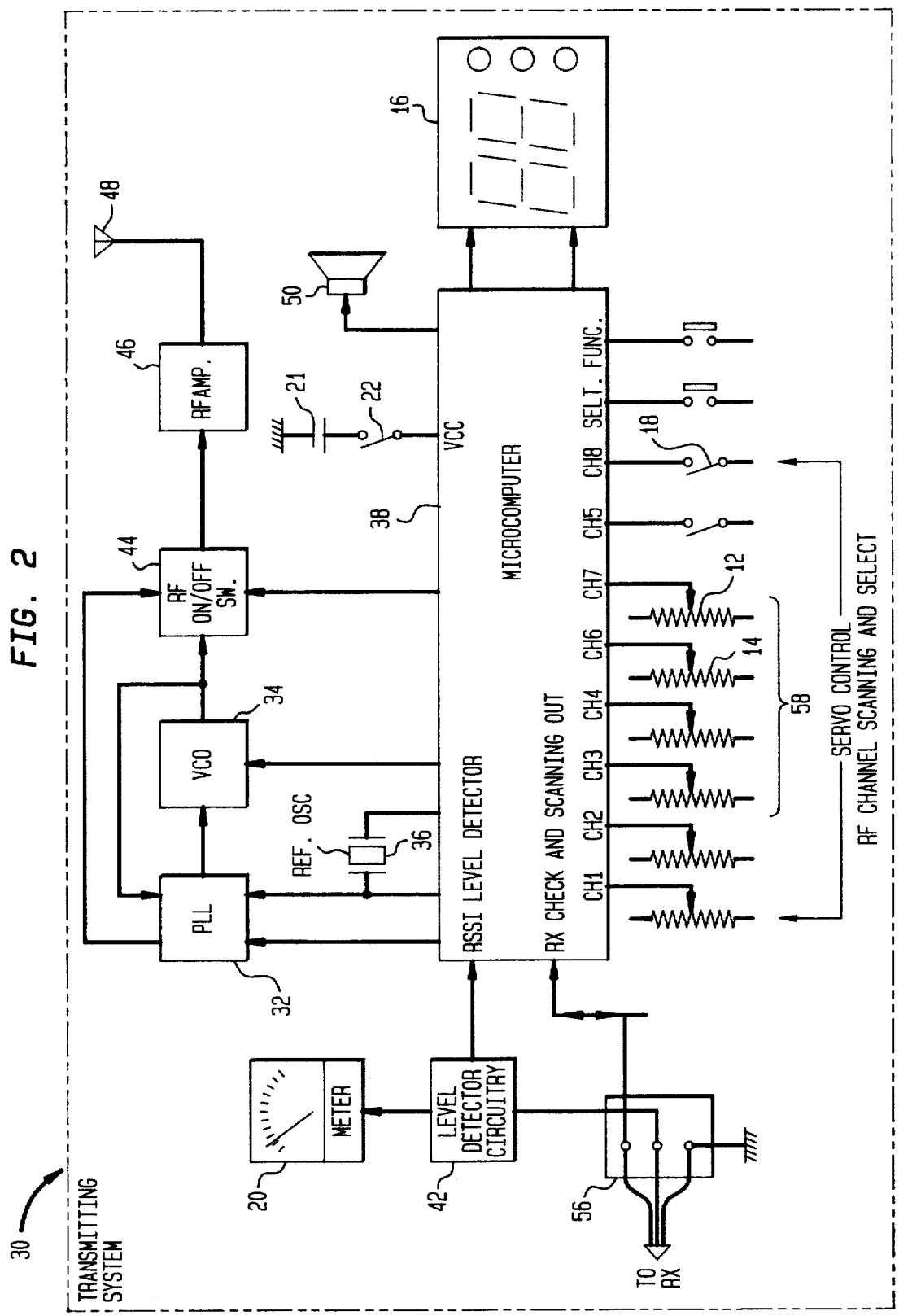
FIG. 2 is a simplified partial block diagram of one embodiment of the transmitting system of the present invention.

A simplified block diagram of the transmitting system 30 is shown in FIG. 2. An integrated circuit 32 including a phase-locked loop (PLL) is connected for electronic communication with integrated circuit 34 including a voltage-controlled oscillator (VCO) and with a microcomputer chip 38. One example of a suitable microcomputer chip 38 for the transmitting system is manufactured by National Semiconductor and is known as the COP888CF Single-Chip MicroCMOS Microcontroller. Other equivalent integrated circuits may also be used. Microcomputer chip 38 works in conjunction with a reference oscillator 36 to assure proper tuning and control over a selected channel. The transmitting system also includes circuitry 44 which acts as a switch for supplying rf energy to amplifying a circuitry 46. An antenna 48 is used to transmit the amplified rf signal to the receiver, as will be discussed in more detail below.

The transmitting system 30 also includes receiving signal strength indicator (RSSI) level detector circuitry 42 which communicates with the computer chip 38 and sends rf field strength signals to the meter 20 for deflection thereof when the remote control system is in the scanning mode. As discussed above, when the remote control system is in the transmitting mode, battery strength signals are sent to the meter 20.

External controls 58 including gimbals 12 and 14 (See FIG. 1) and switch 18, may be used to send control signals to the microcomputer chip 38. Power is supplied to the transmitting system 30 from power source 21, such as a battery, through power switch 22. An audio alarm circuit 50 and LED display 16 are also connected to microcomputer 38. A multi-conductor connection port 56 adapted for engagement with the jumper cable 24 is connected to microcomputer 38; to level detector circuitry 42; and to the system ground of the transmitter.

Figure 3A:
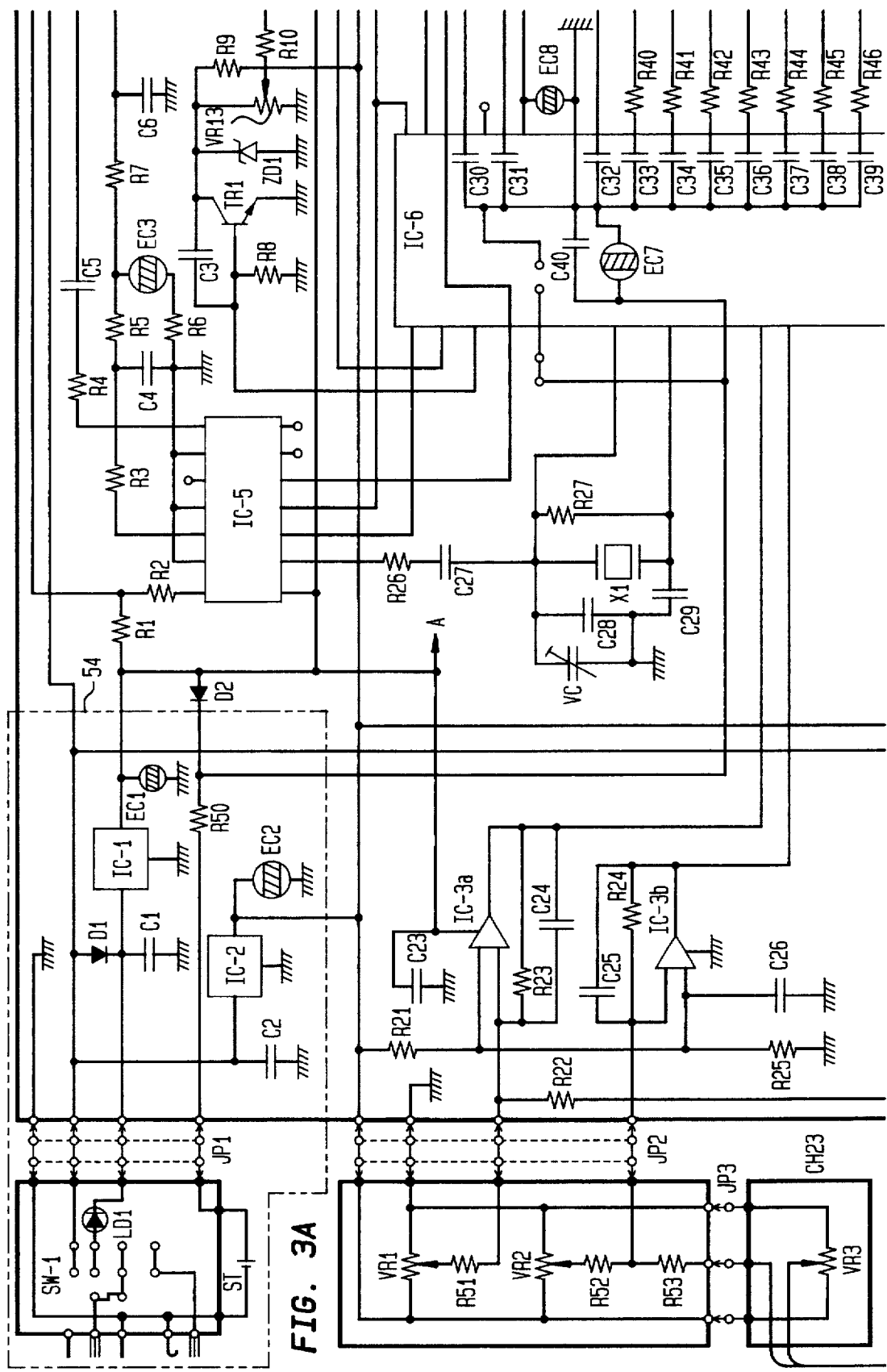
FIG. 3A is a schematic circuit diagram showing a first part of the transmitting system of FIG. 2.
Figure 3C:
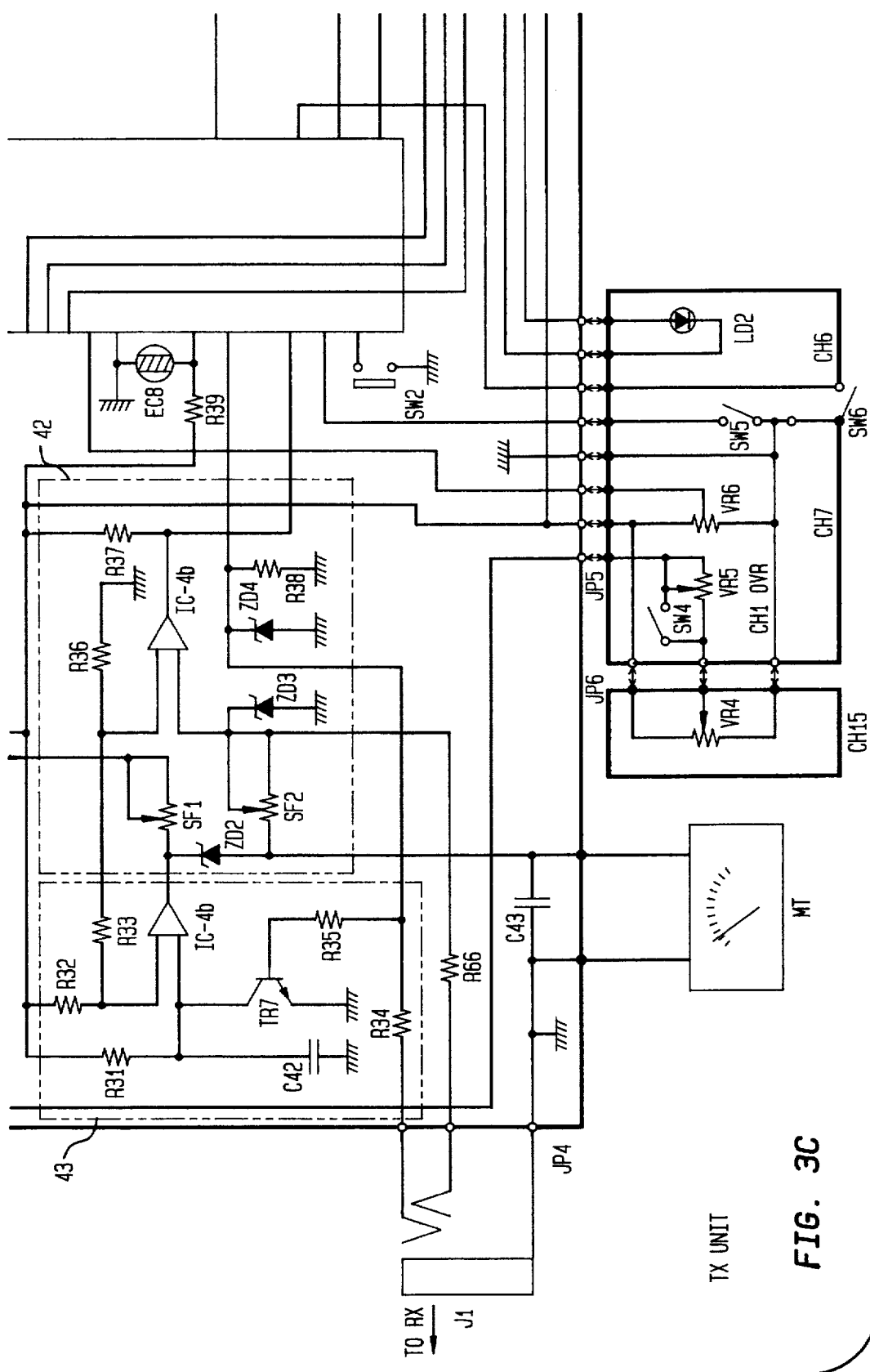
FIG. 3C is a schematic circuit diagram showing a third part of the transmitting system of FIG. 2.
Figure 3D:
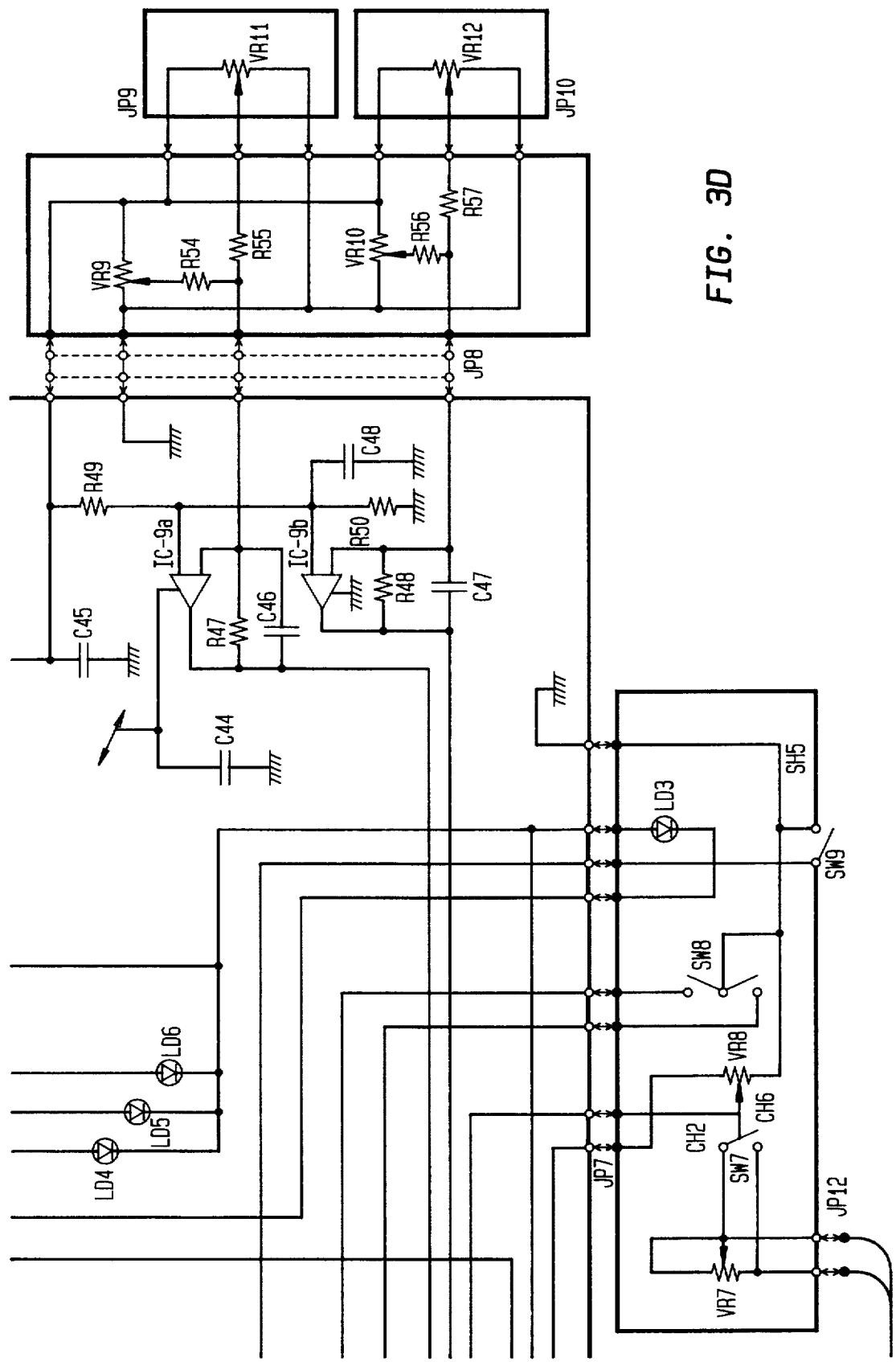
FIG. 3D is a schematic circuit diagram showing a fourth part of the transmitting system of FIG. 2.

The circuitry for the transmitting system is shown in more detail in FIG. 3. The transmitting system includes a power supply with a regulator generally designated 54, the power supply being connected to battery 21 (FIG. 2) via the power supply switch. The level detecting circuitry for sensing interference and the receiver battery strength is generally designated 42 and includes a pair of operational amplifiers, each being designated IC-4b. Additionally, the level detecting circuitry 42 includes a plurality of zener diodes illustrated as ZD2, ZD3 and ZD4. Other preferred components of level detecting circuitry 42 are a plurality of resistors, including potentiometer SF1, a pair of capacitors C42 and C43 and a transistor TR7. The level detecting circuitry 42 is connected to the rf signal strength and battery strength meter MT (shown as meter 20 in FIG. 1 and 2).

As shown in FIGS. 3A–D, the PLL 32 includes an integrated circuit IC-5 and the VCO 34 includes an integrated circuit IC-7. A microcomputer chip IC-6 communicates with the PLL chip IC-5 and the VCO IC-7 to assure that proper tuning and scanning is accomplished. A potentemeter SF3 acts as a modulation level controller which modulates flying control signals received from the microcomputer chip IC-6. The LED display designated 16 in FIGS. 1 and 2 is shown in FIG. 3 by circuit element LDP in conjunction with a plurality of light emitting diodes LD4, LD5 and LD6. As discussed above, depending on the mode that the remote control system is operating in, the display LDP will either show the channels that are being scanned or the tuned channel selected for transmission of rf energy to the receiver.

The warning audio circuit is generally designated 50 in FIG. 3B and is connected to the microcomputer chip IC-6 which will provide an activating signal to audio circuit 50 upon detection of a signal in response to interfering frequency detected by level detecting circuit 42.

The circuit components which make up the rf power switch are also generally designated 44 in FIG. 3B. When tuning of the receiver has been completed and the jumper cable is disconnected from port J1, the switch 44 is closed so that the transmitter may then generate rf energy through rf amplifier circuit 46. The rf energy may then be propagated from the transmitting antenna 48.

Figure 4:
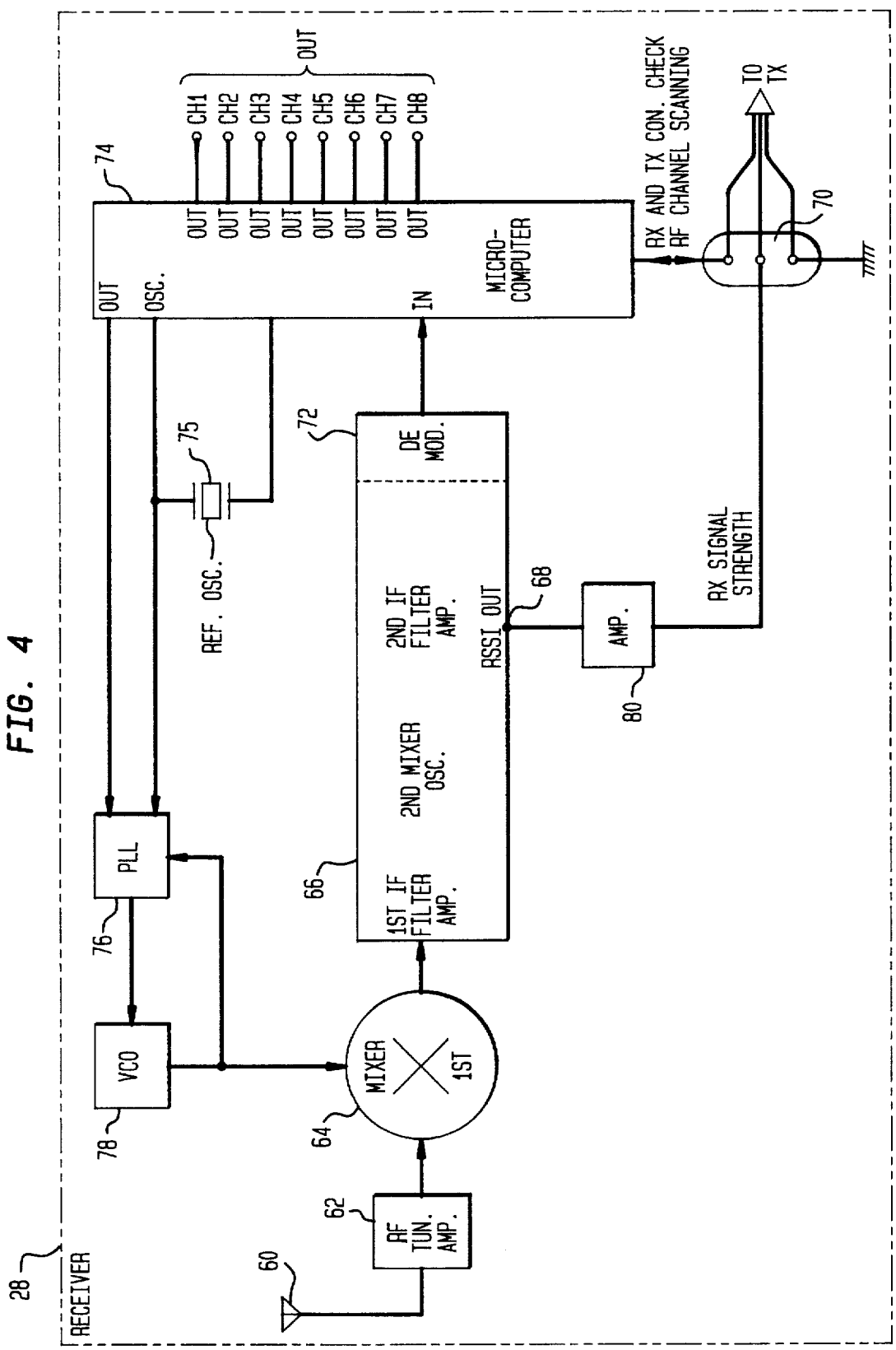
FIG. 4 is a simplified partial block diagram of one embodiment of the receiver circuitry of the present invention.

A receiver 28 is shown in the simplified block diagram of FIG. 4. The receiver includes a receiving antenna 60 adapted to receive rf signals. When the remote control system is in its scanning mode, the receiving antenna 60 will receive any interfering signals. When the remote control system is placed in its transmitting mode, i.e., after the receiver 28 and the transmitter 30 have been tuned and after the jumper cable 24 is disconnected from the transmitting system within the base unit 10 and the receiver 28, the receiving antenna 60 will receive signals transmitted by the rf amplifying circuit 46 through the transmitting antenna 48.

The receiver 28 includes an rf bandwidth tuning amplifying circuit 62 which receives the incoming signal from the antenna 60 regardless of whether the remote control system is in the scanning mode or the transmitting mode. The incoming signal will be within the bandwidth of 72.01–72.99 MHz. This signal is then sent into a first mixer 64 which produces an intermediate frequency (IF) signal of about 10.7 MHz. Mixer 64 is fed by VCO 78, which in turn is controlled by a PLL 76, a crystal oscillator 75 and an oscillator in a microcomputer 74. The IF signal from the first mixer 64 is then sent into a first IF filter and amplifier and then to a second mixer and amplifier. The signal is then passed into a second IF filter amplifier, all of which is generally designated 66 in the block diagram of FIG. 4. If the receiver 28 is in its scanning mode, a signal from the second IF filter amplifier representative of the strength of the received rf carrier will be directed through the RSSI output port 68 and will pass through the jumper cable port 70 and into the jumper cable. This signal will be fed back into the transmitting system 30 (shown in FIG. 2). The carrier strength signal will particularly enter transmitting system 30 through jumper cable port 56 and will pass into the level detecting circuitry 42 for appropriate interference detection.

Referring once again to the block diagram of the transmitting system 30, the received carrier strength signal is processed in the level detecting circuit 42. An analog of this signal is sent to the rf signal strength indicating meter 20 to provide a user with information regarding the relative strength of the interfering signal. The receiver carrier strength signal is further compared to a threshold or standard signal (at op-amp IC-4B) and the result (a 1 or 0, high or low voltage) of this comparison is supplied to the microcomputer chip 38. If the comparison gives a 1 or high, chip 38 actuates associated warning circuitry, such as audio circuitry 50, which will transmit an audible warning, and display 16 circuitry which will cause the LED display 54 to blink as a visual indication that the selected channel is not clear for use.

While the system is in the scanning mode, transmitter microcomputer 38 (FIG. 2) selects new channels either in response to manual input via gimbal 12, or automatically at predetermined intervals, when switch 18 is activated. In either case, whenever the transmitter microcomputer 38 selects a new channel, it signals the receiver microcomputer 74 (FIG. 4) through the jumper cable. One acceptable microcomputer chip is manufactured by National Semiconductor and is a member of the COPS™ family of microcontrollers. More particularly, the COP820C chip is one desirable integrated circuit which may be used for microcomputer 74. Other equivalent integrated circuits may also be used. The receiver microcomputer 74 adjusts its internal oscillator, PLL 76 and VCO 78 to set the appropriate intermediate frequency and thus tunes the receiver to the new channel. Thus, once an acceptable channel is selected, the receiver 28 will be tuned and locked on to a corresponding channel with the transmitting system 30. The jumper cable is then disconnected from port 20 of the receiver 28 shown in FIG. 4 and port 56 of the transmitting system 30 shown in FIG. 2. The transmitting system 30 and the receiver 28 are then automatically placed into a transmitting mode.

Operation of the remote control system in the transmitting mode will now be discussed with reference to FIGS. 2 and 4. Rf energy in correspondence with the selected channel will be generated within the rf amplifier 46. The rf signal will be transmitted through the transmitting antenna 48 and will be received by the receiving antenna 60. The signal will again pass through the rf tuning amplifier 62, the first mixer 64 and the circuitry including an IF filter and amplifier, a second mixer, an oscillator, and a second IF filter and amplifier, all of which is generally designated 66. The signal will be transmitted through demodulator 72 which will provide a control signal to a microcomputer chip 74. Microcomputer 74 takes the demodulated signals and decodes them to provide appropriate control signals on output channels 1 through 8, which in turn actuate control servos in the model aircraft.

Figure 5B:
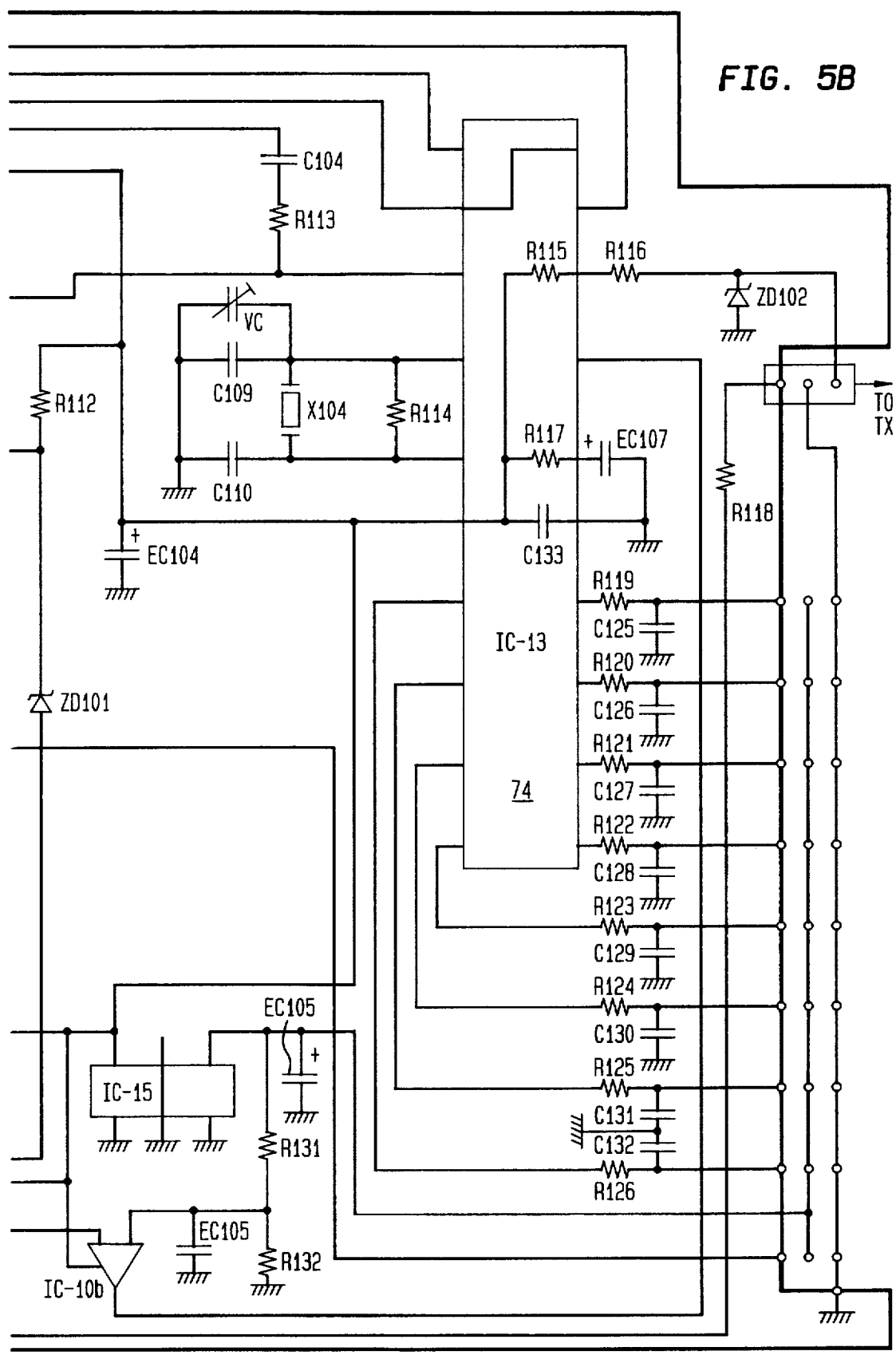
FIG. 5B is a schematic circuit diagram showing a second part of the receiver circuitry of FIG. 4.

A detailed circuit diagram of the receiver is shown in FIGS. 5A–B. The receiving antenna 60 is adapted to receive an incoming signal and pass it on to the rf bandwidth tuning and amplification circuitry 62. The rf tuner is adapted to operate over a iMHz bandwidth in the frequency range of between about 72.01–72.99 MHz. The broadly tuned rf signal is then amplified by TR 101 and passed into IC-12, which includes the first mixer, the first IF filter and amplifier, the second mixer and oscillator, the second IF filter and amplifier, and the demodulator, which are respectively identified by reference numerals 64, 66 and 72 as shown in block diagram format in FIG. 4. The first IF filter may be a crystal filter, and the second IF filter may be a ceramic filter. The crystal filter may permit a frequency of about 10.7 MHz to pass through and the ceramic filter may permit a frequency of about 455 kHz to pass through.

The receiving strength signal amplifying circuitry generally designated 80 in FIGS. 5A–B includes an integrated circuit IC-16a and other circuit components such as resistors R128–R130 and capacitor C124. As discussed above, the signal amplifier 80 will only be operational when the remote control system of the present invention is in the scanning mode.

Figure 6:
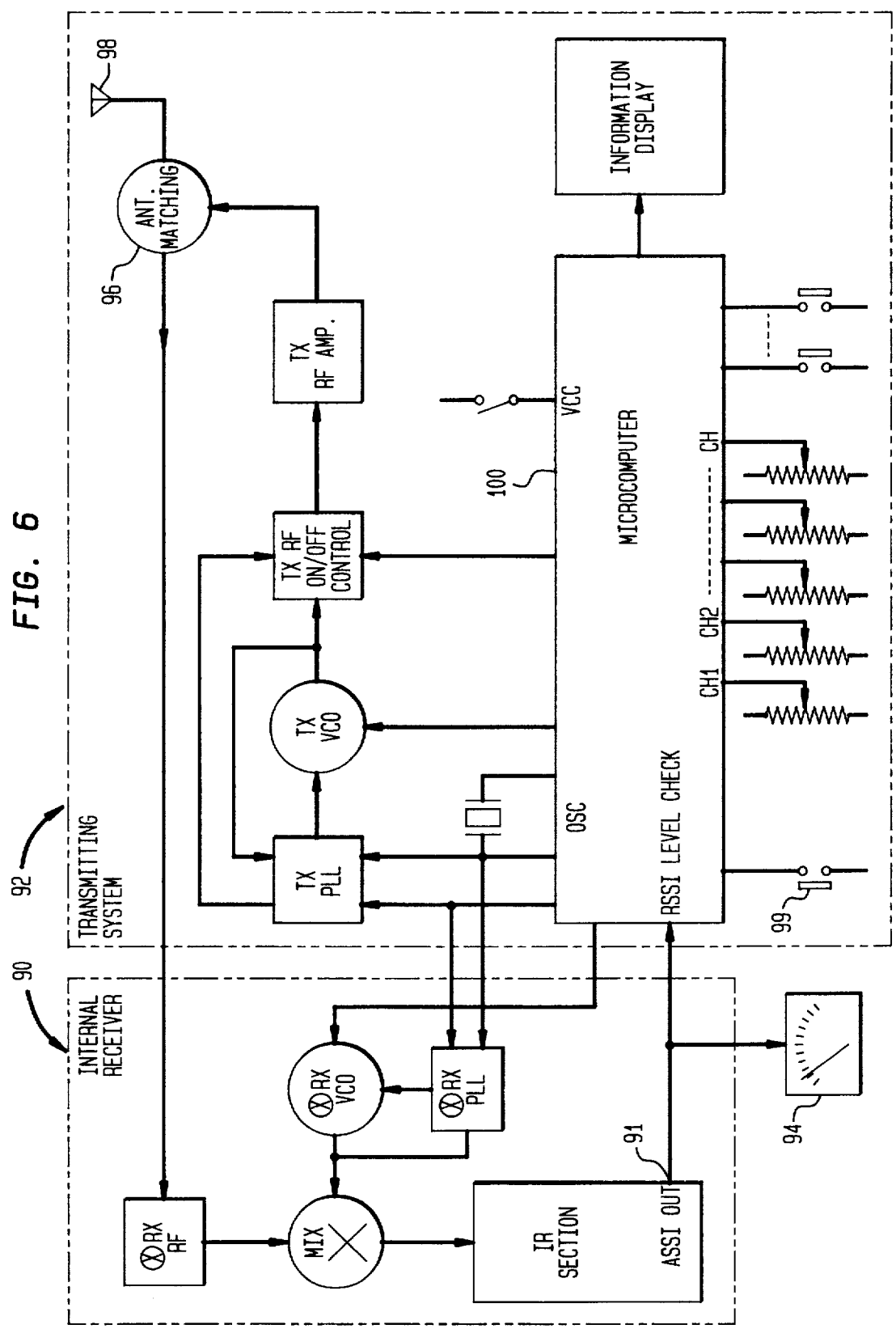
FIG. 6 is a simplified partial block diagram of a second embodiment of the transmitting system of the present invention.

FIGS. 5A–B discloses a more detailed layout of the tuning circuitry for the individual channels of the receiver 28, performed by the microcomputer chip 74, the PLL 76 and the VCO 78 discussed above in connection with FIG. 4. In this regard, FIGS. 5A–B illustrates the microcomputer chip 74 including IC-13, the PLL 76 including IC-11 and the VCO 78 including IC-10. The receiver of FIGS. 5A–B and 6 is an FM receiver that utilizes pulse control modulation. This has the advantageous effect of producing a pure, interference free signal when the receiver has been tuned in sync with the transmitter.

The transmitting system has a stand-by mode which may be actuated by placing power switch 22 into a stand-by position. When the power switch 22 of the base unit 10 is placed in the stand-by position, the transmitter power consumption is reduced to approximately 20 MW, far less than in the scanning or transmitting modes, but enough to hold the channel selection setting in the transmitter microcomputer 38. This is particularly advantageous when a user desires to perform minor maintenance on the model aircraft after a clear flying channel has been selected. When the maintenance of the model aircraft is completed, the power switch 22 should be placed back into its on position to restore full transmitter output power of about 600 MW to the remote control system. The receiver 28 and the transmitting system will automatically be placed back in the transmitting mode and will be tuned to the last selected channel. The receiver 28 is left on during maintenance operations, and remains tuned to the last selected channel. Thus, the associated model aircraft will immediately be available for flying without reconnection of the jumper cable 24 or other external tuning steps. If a user completely turns off the transmitter power supply to perform maintenance operations, the jumper cable must again be used to scan the receiver through the channels and to tune the transmitter and receiver so that they are locked onto a clear channel before flying may be resumed.

As an additional safeguard to assure that an individual will not ignore the warning signals and select a channel that is already in use, the remote control system of the present invention includes lockout circuitry 43 which communicates with the level detecting circuitry 42 and the transmitter microcomputer 38 (IC-6) to automatically prevent the transmitter from emitting rf energy over any channel on which outside interference has been detected. Additionally, the lockout circuitry 43 detects the presence of a control signal upon connection and disconnection of the jumper cable 24 to port 56 of the transmitting system so that the system may be appropriately placed into or out of the scanning and transmitting modes.

Figure 7:
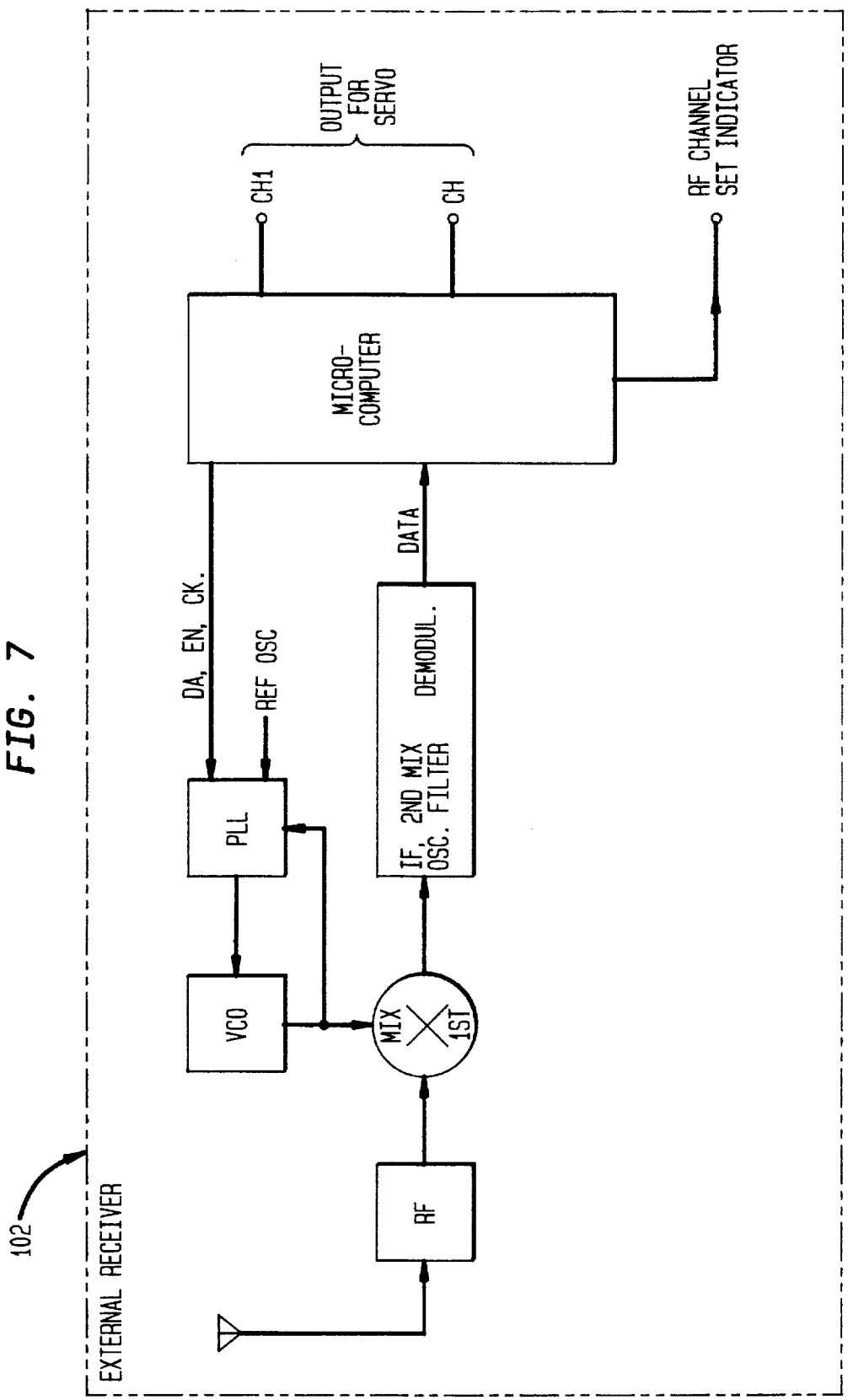
FIG. 7 is a simplified partial block diagram of a second embodiment of the receiver circuitry of the present invention.

FIGS. 6 and 7 illustrate simplified block diagrams of the transmitting system and a receiver in accordance with a second preferred embodiment of the remote control system of the present invention. The scanning and interference detection ability of this preferred embodiment is quite similar to the embodiment discussed above in connection with FIGS. 1–5. However, no jumper cable is required to accomplish scanning of the available channels and tuning of the transmitter and receiver to a clear channel for operation of the model aircraft. This is accomplished by utilizing a second receiver 90 within a base unit, such as base unit housing 10 in correspondence with the transmitting system. This internal receiver 90 will only be used when the remote control system is placed into the scanning mode. As shown in FIG. 6, the internal receiver 90 and the transmitter of the transmitting system 92 may share a common antenna 98 through antenna matching circuitry 96. Additionally both the internal receiver 90 and the transmitting system 92 may be connected for communication with a common microcomputer chip 100. Thus, internal receiver 90 includes a radio signal strength output 91 similar to the output 68 of the receiver 28 discussed above. A signal strength indicator through output 91 is provided to the transmitter circuitry, and is used during the scanning operation in the same way as discussed above.

When scanning of the internal receiver 90 through the channels is completed, and a clear channel has been selected for flying, the transmitter of the transmitting system 92 and the external receiver 102, i.e., the receiver within the model aircraft, may be tuned onto the selected channel. Receiver 102 is shown in block diagram format in FIG. 7.

Since the scanning function is not performed by the external receiver 102, no jumper cable is required to connect the external receiver 102 to the transmitter system 92. Thus, tuning of the external receiver 102 may be accomplished through transmission of rf signals. Once the user has found a clear channel, he actuates a setting switch 99. In response to actuation of the setting switch, transmitter microcomputer 100 locks onto the selected frequency and broadcasts a special "set" code on that frequency. At this stage, the external receiver 102 is in a continual scanning cycle, monitoring all of the channels in sequence. Once the external receiver receives the signal bearing the "set" code, the microcomputer of the external receiver 102 locks the receiver to the frequency on which such code was received. This completes the tuning operation and the remote control system is now placed into the transmitting mode. The receiver 90 within the base unit housing is not utilized after scanning has been completed and thus, is nonoperational during tuning of the receiver 102 within the model aircraft.

The RSSI meter 94 of this embodiment works like the meter 20 discussed above. Thus, meter 94 functions as a receiving signal strength indicator during the scanning mode so that the relative strength of interference on scanned channels can be appreciated, and functions as a battery signal strength meter to determine the relative strength of the battery within the transmitting system when the remote control system is placed into the transmitting mode.

While the foregoing description of figures are directed to the preferred embodiments and method of operating the remote control system in accordance with the present invention, it should be appreciated that various modifications can be made, and are indeed encouraged to be made to the circuit components, arrangement and steps of the disclosed remote control system and methods of using same without departing from the spirit and scope of the present invention which is defined by the claims set forth below.

I claim:

1. A remote control system for use with model aircraft, comprising:

receiver means mounted in correspondence with said model aircraft for receiving rf signals within a selected channel;

transmitter means remote from said receiver means for transmitting rf signals to be picked up by said receiver means within said selected channel;

frequency interference detection means for detecting interference within the selected channel picked up by said receiver means;

warning means arranged to communicate with said frequency interference detection means for providing a warning signal to a user that interference has been detected within the selected channel;

scanning means for selectively scanning said receiver means through a plurality of channels having a predetermined frequency bandwidth so that said frequency interference detection means determines whether interference exists on the channels;

means for permitting the user to selectively place said remote control system into a scanning mode wherein said scanning means and said receiver means are operational and wherein no rf energy is emitted from said transmitter means, said means for selectively placing said remote control system into said scanning mode comprises a jumper cable for electrically connecting said receiver means to said scanning means to permit communication therebetween; and tuning means for locking said receiver means and said transmitter means on a selected one of the plurality of channels which is free of interference so that said user can control the flight of said model aircraft by sending the rf signals from said transmitter means to said receiver means.

2. The remote control system of claim 1, wherein said transmitter means includes a power supply and channel memory means for recalling the last channel selected, said remote control system being selectively placable into a stand-by mode wherein said power supply provides power to said channel memory means and wherein no rf power can be emitted from said transmitter means.

3. The remote control system of claim 2 further comprising lockout means for automatically preventing said selective placement of said remote control system into said transmitting mode upon detection of interference on said selected channel.

4. The remote control system of claim 1, wherein said transmitter means includes a power supply and channel memory means for recalling the last channel selected, said remote control system being selectively placable into a stand-by mode wherein said power supply provides power to said channel memory means and wherein no rf power can be emitted from said transmitter means.

5. The remote control system of claim 1, wherein said scanning means includes manual channel selection means for manually scanning through the plurality of available channels when said remote control system is in said scanning mode.

6. The remote control system of claim 1, wherein said scanning means includes automatic channel selection means for automatically scanning the receiver through the plurality of available channels when said remote control system is in said scanning mode.

7. The remote control system of claim 1, further comprising a base unit housing, each of said transmitter means, said warning means and said scanning means being arranged in said base unit housing.

8. The remote control system of claim 1, wherein said scanning means is operative to adjust said receiver means and said transmitter means to said selected one of said plurality of channels and to stop said adjustment when a channel free of interference is obtained.

9. The remote control system of claim 1, wherein said warning means comprises audio and visual circuitry to send audio and visual signals upon detection of a rf interference signal.

10. The remote control system of claim 1, wherein said frequency interference detection means includes interference quantification means for determining the relative strength of a detected rf interference signal.

11. The remote control system of claim 10, wherein said interference quantification means includes a meter for indicating the relative strength of the detected rf interference signal.

12. The remote control system of claim 11, wherein said receiver means includes a power supply, said meter being operatively connected to said receiver means to indicate the availability of power in said power supply.

13. The remote control system of claim 1, wherein said tuning means comprises phase lock loop circuitry, a voltage controlled oscillator connected for communication with said phase lock loop circuitry, and microcomputer means providing control signals to said phase lock loop circuitry.

14. The remote control system of claim 1, wherein said transmitter means can transmit the rf signals over any one of fifty channels in it frequency range between about 72.01–72.99 Mhz, each of said channels having a bandwidth of about twenty kHz, said receiver means can receive the rf signals on any of said fifty channels.

15. A remote control system for use with model aircraft, comprising:

a model aircraft to be controlled by said remote control system;

receiver means arranged in said model aircraft for receiving rf signals within a selected channel;

transmitter means remote from said receiver means for transmitting rf signals to be picked up by said receiver means within selected channel to control the flight of said model aircraft;

frequency interference detection means for detecting interference within the selected channel picked up by said receiver means;

warning means arranged to communicate with said frequency interference detection means for providing a warning signal to a user that interference has been detected within the selected channel;

scanning means for selectively scanning said receiver means through a plurality of channels so that said frequency interference detection means determines whether interference exists on the channels;

means for permitting the user to selectively place said remote control system into a scanning mode wherein said scanning means and said receiver means are operational and wherein no rf energy is emitted from said transmitter means, said means for selectively placing said remote control system into said scanning mode comprises a jumper cable and means for temporarily connecting said jumper cable between a base unit housing and said model aircraft so as to electrically connect said receiver means to said scanning means to permit communication therebetween and wherein said base unit housing comprises said transmitter means, said frequency interference detection means, said warning means and said scanning means; and 16. The remote control system of claim 15, further comprising means for permitting the user to selectively place said remote control system into a transmitting mode wherein said transmitter means transmits rf energy to communicate with said receiver means so that a user can control the flight of an associated model aircraft and wherein said scanning means is rendered nonoperational.

17. The remote control system of claim 16 further comprising lockout means for automatically preventing said selective placement of said remote control system into said transmitting mode upon detection of interference on a selected channel.

18. The remote control system of claim 18, wherein said transmitter means includes a power supply and channel memory means for recalling the last channel selected, said remote control system being selectively placable into a stand-by mode wherein said power supply provides power to said channel memory means and wherein no rf power can be emitted from said transmitter means.

19. The remote control system of claim 15, wherein said scanning means includes manual channel selection means for manually scanning the receiver through the plurality of available channels when said remote control system is in said scanning mode.

20. The remote control system of claim 15, wherein said scanning means includes automatic channel selection means for automatically scanning the receiver through the plurality of available channels when said remote control system is in said scanning mode.

21. The remote control system of claim 15, wherein said scanning means is operative to adjust said receiver means and said transmitter means to said selected one of said plurality of channels and to stop said adjustment when a channel free of interference is obtained.

22. The remote control system of claim 15, wherein said warning means comprises audio and visual circuitry to provide audio and visual signals upon detection of an rf interference signal.

23. The remote control system of claim 15, wherein said frequency interference detection means includes interference quantification means for determining relative strength of a detected rf interference signal.

24. The remote control system of claim 23, wherein said interference quantification means includes a meter for indicating the relative strength of the detected rf interference signal.

25. The remote control system of claim 24, wherein said receiver means includes a power supply, said meter being operatively connected to said receiver means to indicate the availability of power in said power supply.

26. The remote control system of claim 15, wherein said tuning means comprises phase lock loop circuitry, a voltage controlled oscillator connected for communication with said phase lock loop circuitry, and microcomputer means for providing control signals to said phase lock loop circuitry.

27. The remote control system of claim 15, wherein said transmitter can transmit the rf signals over any one of fifty channels in a frequency range of between about 72.01–72.99 Mhz, each of said channels having a bandwidth of about twenty kHz, said receiver means can receive the transmitted rf signals.

28. A method of selecting a frequency bandwidth for use when flying remotely controlled model aircraft comprising the steps of:

providing power to a remote control system including a transmitter, a receiver, scanning circuitry and frequency interference detecting circuitry and warning circuitry;

placing the remote control system into a scanning mode by temporarily connecting a jumper cable between the scanning circuitry and the receiver wherein no rf energy is transmitted from the transmitter and the scanning circuitry is operational to actuate the receiver to scan through a plurality of channels so that the interference detecting circuitry determines whether interference exists on the plurality of scanned channels;

providing a warning signal upon detection of interference by the frequency interference detecting circuitry;

selecting a channel that is free of interference;

tuning the receiver and the transmitter to the selected channel; and placing the remote control system into a transmitting mode wherein the scanning circuitry is nonoperational and wherein the transmitter transmits rf energy on the selected channel to communicate with the receiver so that a user can control the flight of said associated model aircraft.

29. The method of claim 28 wherein the step of selecting a channel that is free of interference is performed manually.

30. The method of claim 28, wherein the step of placing the remote control system into the transmitting mode comprises the step of removing the jumper cable from its conducting position between the scanning circuitry and the receiver.

31. The method of claim 28, wherein the step of placing the remote control system into the transmitting mode comprises the step of removing the jumper cable from its conducting position.

32. The method of claim 31 wherein the receiver is arranged in said model aircraft and wherein at least some of the other components of the remote control system are arranged in a base unit housing, said step of connecting the jumper cable between the scanning circuitry and the receiver comprises connecting the jumper cable between a port in the base unit housing and a port in the model aircraft.

33. The method of claim 31 wherein the receiver is arranged in said model aircraft and wherein at least some of the other components of the remote control system are arranged in a base unit housing, said step of removing the jumper cable from its conducting position between the scanning circuitry and the housing comprises removing the jumper cable from a port in the base unit and a port in the model aircraft.

tuning means for locking said receiver means and said transmitter means on a selected one of the plurality of channels which is free of interference so that said user can control the flight of said model aircraft by sending rf signals from said transmitter means to said receiver means.

* * * * *

UNITED STATES PATENT AND TRADEMARK OFFICE
CERTIFICATE OF CORRECTION

PATENT NO. : 5,499,388

DATED : March 12, 1996

INVENTOR(S) : Byung M. Song

Page 1 of 2

It is certified that error appears in the above-identified patent and that said Letters Patent is hereby corrected as shown below:

Column 1, line 46, "once a available" should read --once an available--.
Column 7, line 30, "SF1" should read --$SF_1$--.
Column 9, line 19, "iMHz" should read --1 MHz--.
Column 9, line 32, "5A-B" should read --5A--.
Column 11, line 57, "2. The remote control system of claim 1, wherein said transmitter means includes a power supply and channel memory means for recalling the last channel selected, said remote control system being selectively placable into a stand-by mode wherein said power supply provides power to said channel memory means and wherein no rf power can be emitted from said transmitter means." should read --2. The remote control system of claim 1, further comprising means for permitting the user to selectively place said remote control system into a transmitting mode wherein said transmitter means transmits rf energy to communicate with said receiver means so that a user can control the flight of an associated model aircraft and wherein said scanning means is rendered nonoperational.--.

Column 12, line 30, "the relative" should read --relative--.
Column 12, line 47, "it" should read --a--.
Column 13, line 18, after "scanning means; and" insert --tuning means for locking said receiver means and said transmitter means on a selected one of the plurality of channels which is free of interference so that said user can control the flight of said model aircraft by sending rf signals from said transmitter means to said receiver means.--.

UNITED STATES PATENT AND TRADEMARK OFFICE
CERTIFICATE OF CORRECTION

PATENT NO. : 5,499,388

DATED : March 12, 1996

INVENTOR(S) : Byung M. Song

It is certified that error appears in the above-identified patent and that said Letters Patent is hereby corrected as shown below:

Column 13, line 30, "claim 18" should read --claim 15--.
Column 14, line 36, "a" should read --said--.
Column 14, line 42, "The method of claim 28, wherein the step of placing the remote control system into the transmitting mode comprises the step of removing the jumper cable from its conducting position" should read --The method of claim 28 wherein the step of selecting said channel that is free of interference is performed automatically--.
Column 14, line 46, "claim 31" should read --claim 30--.
Column 14, line 60, cancel the words "tuning means for locking said receiver means and said transmitter means on a selected one of the plurality of channels which is free of interference so that said user can control the flight of said model aircraft by sending rf signals from said transmitter means to said receiver means."

Signed and Sealed this

Tenth Day of December, 1996

Attest:

BRUCE LEHMAN

Attesting Officer

Commissioner of Patents and Trademarks